United States Patent [19]

Giordano et al.

[11] 4,019,954
[45] Apr. 26, 1977

[54] SAFETY DEVICE FOR A NUCLEAR REACTOR AND ESPECIALLY A FAST REACTOR

[75] Inventors: Fernand Giordano, Saint-Etienne; Pierre Marmonier; Jean Vayra, both of Aix-en-Provence, all of France

[73] Assignee: Commissariat a l'Energie Atomique, Paris, France

[22] Filed: Nov. 7, 1974

[21] Appl. No.: 521,900

[52] U.S. Cl. .................. 176/38; 176/36 C
[51] Int. Cl.[2] ........................... G21C 9/00
[58] Field of Search ......... 176/35, 36 R, 36 C, 176/36 S

[56] References Cited

UNITED STATES PATENTS

| 2,885,893 | 5/1959 | Lane et al. ............... 74/2 |
| 2,994,655 | 8/1961 | Taylor ............... 176/36 R X |
| 3,438,856 | 4/1969 | Ripley ............... 176/29 |
| 3,445,334 | 5/1969 | Humphries, Jr. ............... 176/36 |
| 3,448,006 | 6/1969 | Fortescue et al. ............... 176/36 |
| 3,676,296 | 7/1972 | Linning et al. ............... 176/35 |
| 3,733,251 | 5/1973 | Gilbertson et al. ............... 776/36 R |
| 3,773,617 | 11/1973 | Marmonier et al. ............... 176/36 R |

FOREIGN PATENTS OR APPLICATIONS

| 2,058,619 | 5/1972 | Germany ............... 176/36 R |
| 1,327,196 | 8/1973 | United Kingdom ............... 176/36 R |
| 1,064,382 | 4/1967 | United Kingdom ............... 176/36 R |

Primary Examiner—Stephen C. Bentley
Assistant Examiner—Ralph Palo
Attorney, Agent, or Firm—Cameron, Kerkam, Sutton, Stowell & Stowell

[57] ABSTRACT

The safety device comprises an absorber element connected by a separable coupling to the lower end of a vertical operating stem. When released, the absorber element drops under gravity from a top position to a bottom position within an open-topped casing placed among wrappers containing fuel pin bundles. In the top position of the absorber element, the disconnectable coupling is placed at the top and partly within the interior of the casing while the absorber element extends within said casing into the peripheral blanket zone located externally of the central fuel zone.

5 Claims, 8 Drawing Figures

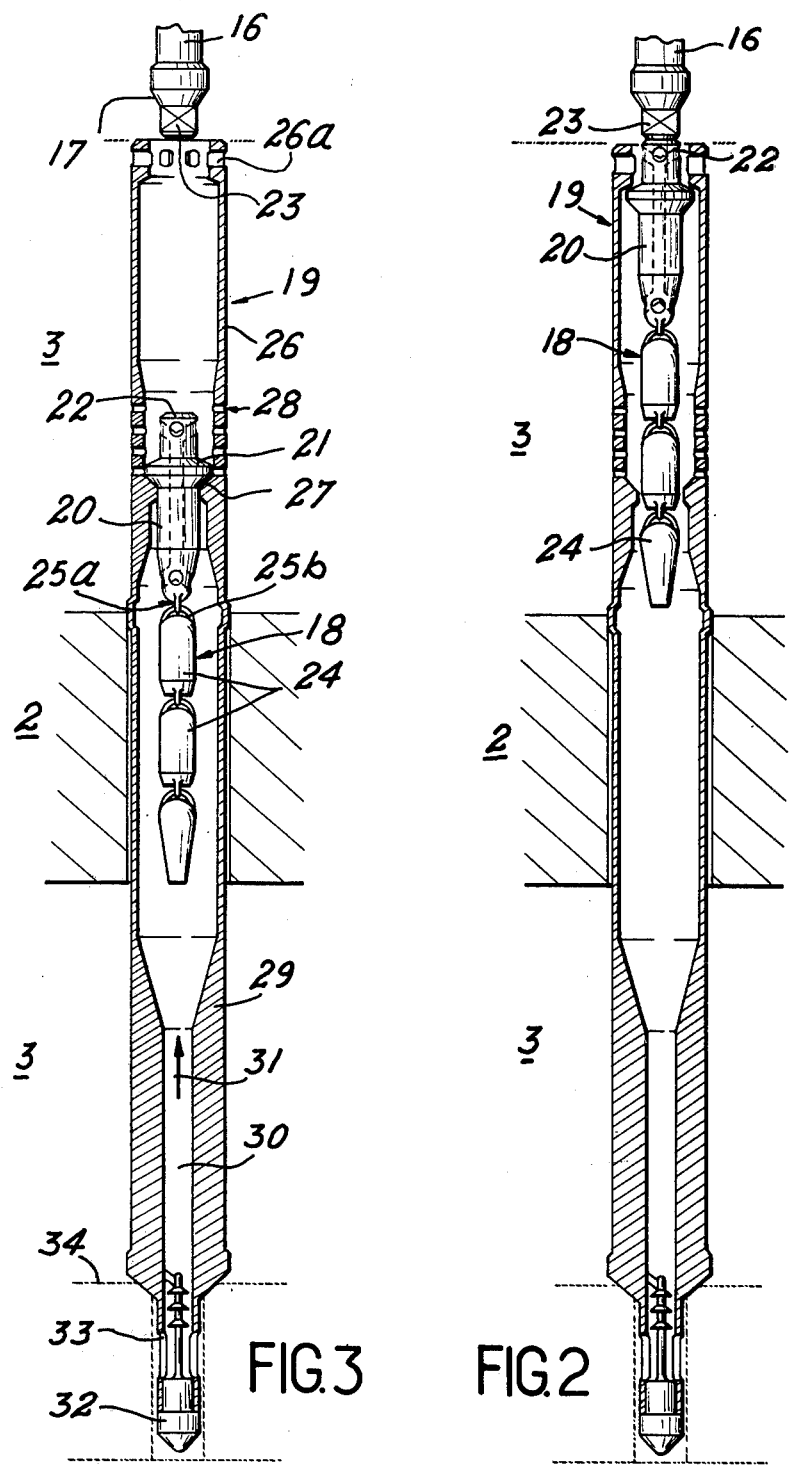

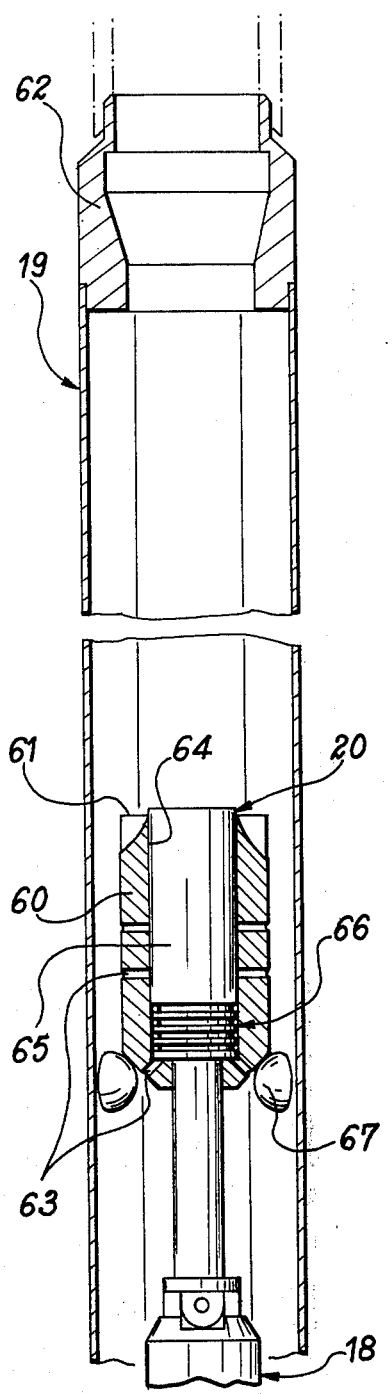
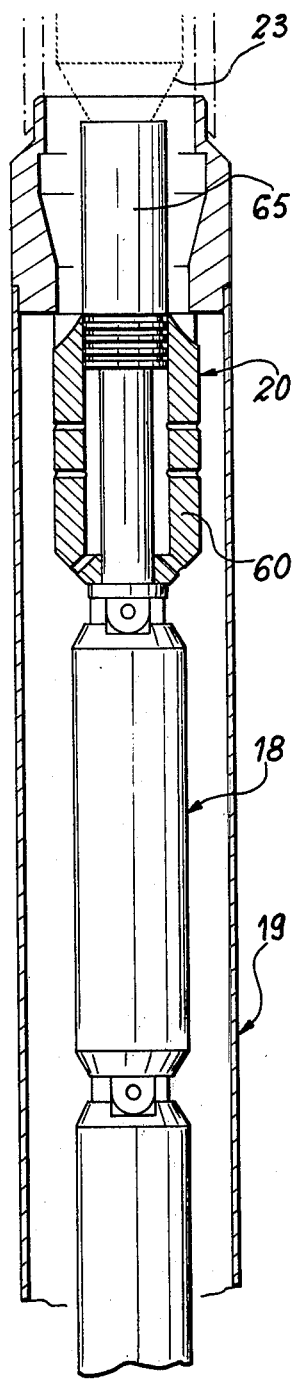
FIG. 7a
FIG. 7b

SAFETY DEVICE FOR A NUCLEAR REACTOR AND ESPECIALLY A FAST REACTOR

This invention relates to a safety device for a nuclear reactor and especially a fast reactor, the reactor core being cooled by a circulation of liquid metal usually consisting of sodium and being constituted by a central or so-called fuel zone and a peripheral blanket zone which completely surrounds the central zone.

Various types of safety systems for reactors of this type have already been constructed. In a typical safety system, a neutron-absorbing element in the form of a rod or like component is so arranged as to permit instantaneous release from a suitable supporting mechanism placed above the reactor core. This absorber element is consequently capable of falling freely within a vertical passage extending through the reactor core and of stopping the fission reaction of the fuel as a result of the negative reactivity which it introduces. In an arrangement of this type, means have already been provided for avoiding the dangers arising from deformation of the reactor core during operation. One consequence of such deformation is the impairment of linear straightness of the passage which receives the absorber element when it falls into the reactor core. Another possible consequence is misalignment between said passage and the axis of a rod or member of the same type which supports the absorber element and serves to operate this latter from the exterior of the reactor, either before or after the free fall of the absorber element into the reactor core. In the case just mentioned, if the absorber element which is suspended from its control rod is not exactly in the axis of the passage through the reactor core which is intended to receive said element, the fall within said passage can in fact be disturbed or even wholly prevented; in such a case, this device no longer performs the essential function which is assigned thereto.

In order to overcome this disadvantage, it has already been proposed to construct the absorber element in the form of an articulated assembly such as a chain or the like which is suspended from the lower end of the control rod by means of a grab or an electromagnet. The control rod is guided from a top shield plug which closes the reactor containment vessel, within a sliding sleeve placed above the passage which receives the absorber element within the reactor core, said sleeve being capable of containing said absorber element when it is placed outside the reactor core prior to dropping of this latter within the passage. In this form of construction, the lower end of the absorber element advantageously projects from the base of the sliding sleeve and penetrates to a greater or lesser extent into the vertical passage of the reactor core so as to permit engagement with the element at the time of initiation of a fast drop even if the passage and the sleeve are slightly misaligned.

The present invention is directed to an improvement in the arrangements of the type recalled in the foregoing.

To this end, the safety device under consideration comprises an absorber element provided with a supporting head joined by a disconnectable coupling to the lower extremity of an axially movable vertical operating stem. After the separation of the disconnectable coupling, said absorber element is capable of dropping under gravity from a top position to a bottom position within a passage formed through the reactor core by a wrapper-type casing which is open at the upper extremity thereof and placed among wrappers containing nuclear fuel. Within the reactor core which is cooled by an upward circulation of liquid metal, the fuel wrappers form a central fuel zone and a peripheral blanket zone which completely surrounds the central zone. The safety device is distinguished by the fact that the disconnectable coupling between the head of the absorber element and the extremity of the operating stem is placed in the top position of the absorber element at the top portion and at least to a partial extent within the interior of the open-topped casing whilst the absorber element extends within said casing into the peripheral blanket zone located externally of the central zone.

By virtue of this arrangement, dropping of the absorber element within the casing is performed automatically as soon as a deformation of the reactor core occurs and results in an appreciable displacement between the upper portion of the casing which contains the absorber element and the axis of the operating stem, thereby causing the separation of the disconnectable coupling between the head of the absorber element and said operating stem.

As an advantageous feature, the absorber element is designed in an articulated form by means of absorber links attached to each other beneath the absorber element head. This particular configuration of the absorber element serves in particular to permit the free fall of this latter within the open-topped casing despite any possible partial flattening or buckling of the element which may be caused by adjacent wrappers containing the core fuel. The disconnectable coupling is preferably provided by means of an armature of an electromagnet which is mounted at the lower extremity of the operating stem, said armature being brought into the immediate vicinity of the top portion of the casing but externally of this latter.

In accordance with a further arrangement, the head of the absorber element is adapted in the bottom position to cooperate by means of an external annular projection with an internal abutment shoulder of the open-topped casing so as to stop the falling motion of the absorber element at the vertical level of the central core zone.

The internal surface of the open-topped casing is preferably provided above the abutment shoulder with a damping system of the dashpot type which slows down the end of falling motion of the absorber element by producing action on the head of said element. This system can be designed in particular by forming holes of small diameter in the wall of the open-topped casing so as to permit the escape of the liquid metal coolant which flows through the reactor core, said coolant being compressed within the casing between the annular projection of the absorber element head and the abutment shoulder.

Moreover, and in accordance with a particular feature of the invention, the head of the absorber element traverses a cylindrical valve in the top position within the open casing, said valve being coaxial with said casing and fitted with a spring applied against a collar formed at the lower end of the valve so as to separate the disconnectable coupling from the armature of the electromagnet in the event of a limitation of flow of the liquid metal coolant within the casing.

Further characteristic features of a safety device for a nuclear reactor as constructed in accordance with the invention will become apparent from the following description of one exemplified embodiment which is given by way of indication and not in any limiting sense, reference being made to the accompanying drawings, wherein:

FIGS. 2 and 3 are views to a larger scale showing the constructional detail of the absorber element employed in the safety device under consideration as well as the open-topped casing which serves to guide said absorber element in its free fall through the reactor core;

FIGS. 7a and 7b illustrate another alternative form of construction of a device for slowing-down the absorber element at the end of travel within its casing.

Figure 1:
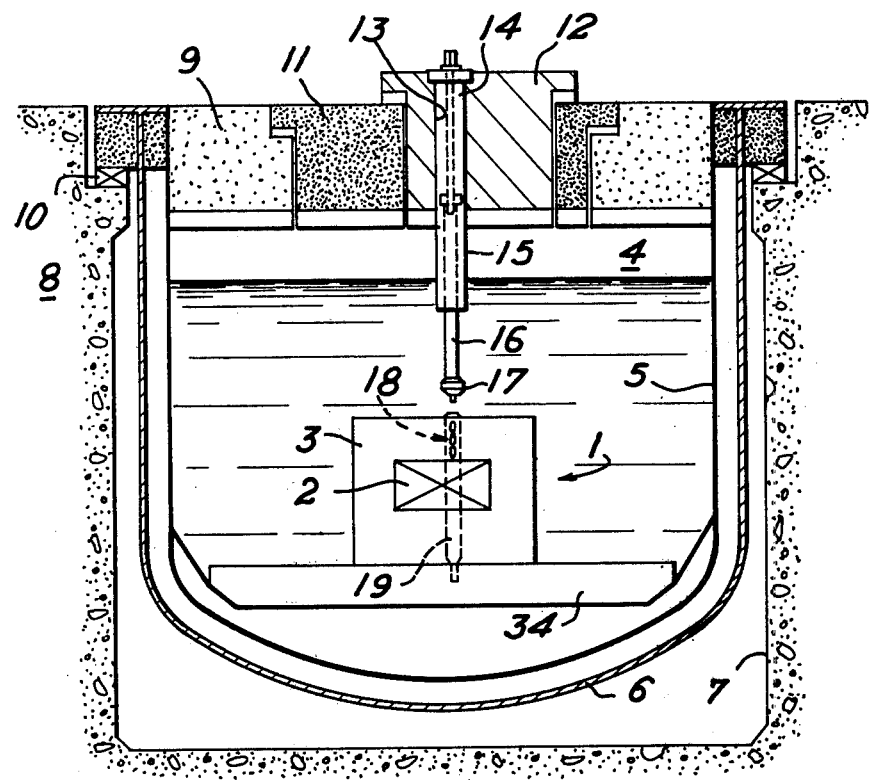
FIG. 1 is a diagrammatic transverse sectional view of the reactor core and of the outer containment vault of a fast reactor equipped with a safety device in accordance with the invention.

In FIG. 1, the core of a nuclear reactor and especially a fast reactor is generally designated by the reference numeral 1. The reactor core comprises a central zone or fuel zone 2 in which the fissile material proper is assembled and a peripheral zone 3 which completely surrounds the central zone 2 so as to constitute the so-called lateral blankets, namely the top and bottom core blankets in which the fertile material is assembled.

In a manner which is conventional in itself but has not been illustrated in order to avoid undue complication of the drawings, the reactor core 1 as considered across the zones 2 and 3 is formed by groups of fuel assemblies in adjacent relation. As a rule, the fuel assemblies are constituted by so-called wrappers having a generally elongated shape and usually having a hexagonal cross-section, said wrappers being open at the top ends and held in position at the bottom ends which are engaged in a support grid or diagrid 34. Each wrapper contains a bundle of parallel canned pins containing nuclear fuel which is respectively fissile in the central zone 2 and fertile in the peripheral zone 3 above and below the central zone. The lateral blanket is also constituted by fertile material.

The entire reactor core structure which is thus formed is immersed in a suitable volume 4 of liquid metal coolant usually consisting of sodium and circulated through the reactor core in an upward direction. The coolant penetrates into the fuel assemblies at the lower ends of these latter and, after passing out of the reactor core, is distributed within a metallic vessel 5 in which are mounted heat exchangers and circulting pumps (not shown in the drawings). It is worthy of note that said vessel or so-called main vessel can advantageously be associated with another vessel or so-called primary vessel (not shown) which contains the core and ensures separation of the hot sodium from the cold sodium contained in the main vessel.

The main vessel 5 is surrounded by a leak jacket or safety vessel 6, the two vessels being mounted within a cavity 7 formed within an external containment vault 8 having thick walls which are usually of concrete. The cavity 7 of the containment vault 8 is closed by a top horizontal vault roof 9 which is also of concrete and is supported on corbels of the concrete vault by bearing and sealing devices 10.

In accordance with usual practice in this type of reactor, the vault roof 9 is provided at the center above the reactor core 1 with a number of rotating shields designated respectively in this example by the references 11 and 12 and placed in eccentric relation. As a result of a combination of relative movements of rotation within the vault roof 9, said rotating shields make it possible to bring to any desired position above the reactor core 1 opposite to any predetermined fuel assembly of the core a device for handling or performing remedial work on said fuel assembly (said handling device having been omitted from the drawings).

Similarly, the rotating shield plug 12 is equipped with a control mechanism 14 which extends through a vertical bore 13 formed within said plug and the constructional detail of which will be explained below with reference to FIGS. 4 and 5. In particular, said mechanism comprises a sleeve 15 for guiding a hollow axial stem 16 equipped with an electromagnet 17 at the lower end which penetrates into the primary vessel, said electromagnet being immersed in the volume 4 of liquid sodium above the reactor core.

In accordance with the invention, said electromagnet 17 is intended to operate, support and control the tripping of an absorber element 18 either by ensuring that this latter is maintained in the upper portion of an open-topped casing 19 which extends through the reactor core and constitutes a vertical passage within this latter or by permitting the free fall of said absorber element when the voltage is reduced to zero in the electromagnet 17 or as a result of appreciable misalignment between the casing 19 and the axis of the operating stem 16.

The casing 19 whose geometry is preferably identical with that of the fuel assembly wrappers within the reactor core 1 has an open top end and the longitudinal dimensions of the absorber element 18 are such that, when said element is supported by the electromagnet 17 and this latter is just engaged at the top end of said casing, said absorber element is placed wholly outside the central portion 2 and completely contained within the top blanket of the peripheral portion 3 of the reactor core 1.

FIGS. 2 and 3 illustrate to a larger scale the constructional detail of the absorber element 18 and the open casing 19 which extends through the reactor core 1. In FIG. 2, the absorber element is represented in the top position within said casing as a result of suspension beneath the electromagnet 17. In FIG. 3, the absorber element is shown in the bottom position in which it has dropped to a partial extent within the casing 19, thereby introducing within the central portion 2 the negative reactivity which is necessary to stop the fission reaction within the reactor core 1 and to initiate reactor shutdown.

As shown in these figures, the absorber element 18 mainly comprises a massive head 20 of generally cylindrical shape which is provided at the upper extremity with a transverse annular projection 21 extended towards the top of the casing 19 by an end-piece 22 for coupling the element to the electromagnet 17. To this end, said electromagnet has a flat bottom armature 23 having a bearing surface adapted to the dimensions of the end-piece 22. Said armature is intended to be brought into the immediate vicinity of the top portion of the casing 19 immediately above this latter in order that the element 18 may accordingly be either maintained in a top position within the casing or retrieved in its bottom position after a free fall and returned upwards in readiness for further operation.

There are mounted beneath the head 20 of the absorber element 18 a number of successive links 24 incorporating a material having a high neutron capture cross-section and formed especially of boron carbide 90 percent enriched in boron-10 ($B^{10}$). Said links of generally cylindrical shape are articulated from one link to the next by any suitable means, especially in the example shown by means of a system comprising two half-rings 25a and 25b which provides a maximum possibility of deformation of the complete assembly.

In another design, the coupling between successive links can be provided by means of a knuckle-joint element or the like. The links 24 are advantageously designed in the form of steel cups filled with boron, the extremities of which are given a conical profile or are rounded so as to facilitate penetration of the absorber element into the liquid metal which normally flows through the casing 19 as it passes through the reactor core 1. The diameter of the cups is determined by the minimum clearance to be left during operation between said cups and the internal surface of the casing 19 without introducing any harmful vibrations.

The absorber element casing is mainly constituted by an outer shell 26, the transverse cross-section of which is identical with that of the fuel assembly wrappers of the reactor core 1. Said shell 26 is provided at its open top end with a groove 26a for gripping the casing 19 by means of a handling device (not shown) so as to make it possible in particular to extract the casing from the reactor core either for repairs or replacement. There is formed in the internal surface of the shell, substantially above the level of the central portion 2 of the reactor core, an internal abutment shoulder 27 in the form of a seating which is capable of cooperating with the annular projection 21 of the head 20 of the absorber element 18 in order to ensure accurate positioning of the links 24 within the central zone 2 of the reactor core after dropping of the absorber element 18.

By way of alternative, said abutment shoulder can be formed by means of projecting lugs in the internal surface of the shell of the absorber element casing, said lugs being spaced at uniform intervals around the axis of the shell as shown in FIGS. 7a and 7b.

In order to slow-down the end of the falling motion of the absorber element 18, there is incorporated in the casing 19 a dashpot device constituted in the most simple manner by a series of holes 28 of small diameter formed in the lateral surface of the shell 26 above the shoulder 27. Thus the liquid metal coolant which is present within the casing 19 is driven towards the exterior of the casing through said holes at the time of falling of the head 20. The action thus produced is similar to that of a hydraulic piston with a high pressure drop as a result of compression of the corresponding volume of liquid metal between the moving system consisting of the head 20 and annular projection 21, the internal wall of the shell 26 and the shoulder 27.

The shell 26 of the casing 19 has a bottom end section 29 provided with an axial bore 30 for the circulation of liquid metal coolant which passes upwards into the casing in the direction of the arrow 31. Said bottom end section 29 has an extension in the form of a positioning end-fitting 32 provided with lateral ports 33 through which the liquid metal is permitted to pass into the bore 30. Said end-fitting also penetrates into a suitable recess in the diagrid 34 on which the entire reactor core 1 is supported.

Figure 4:
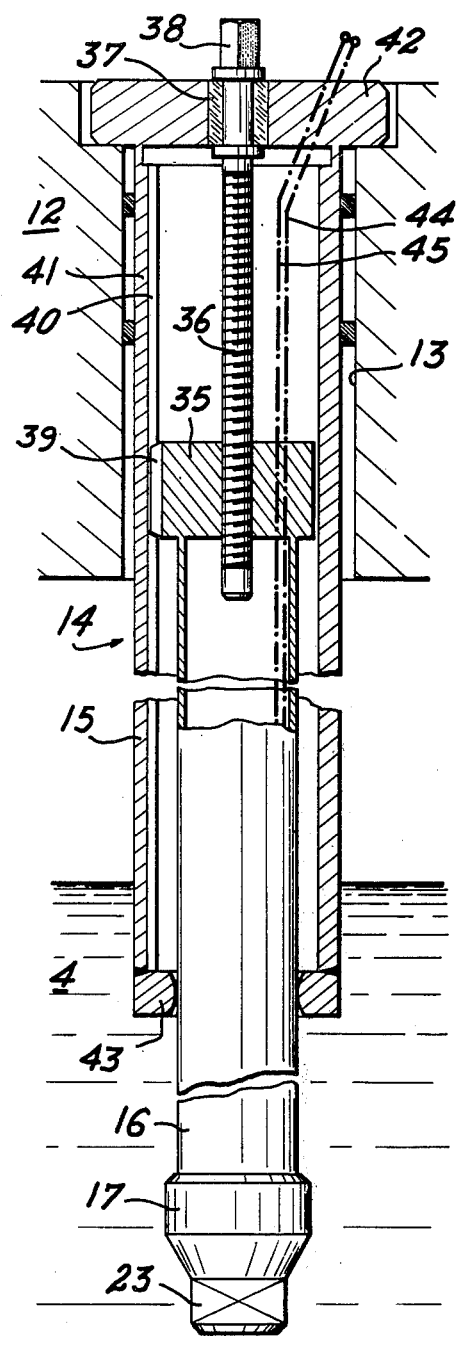
FIGS. 4 and 5 are further views to a larger scale showing two alternative forms of construction of the operating stem and control mechanism for displacing the absorber element either before or after its free fall within the casing which extends through the reactor core.
Figure 5:
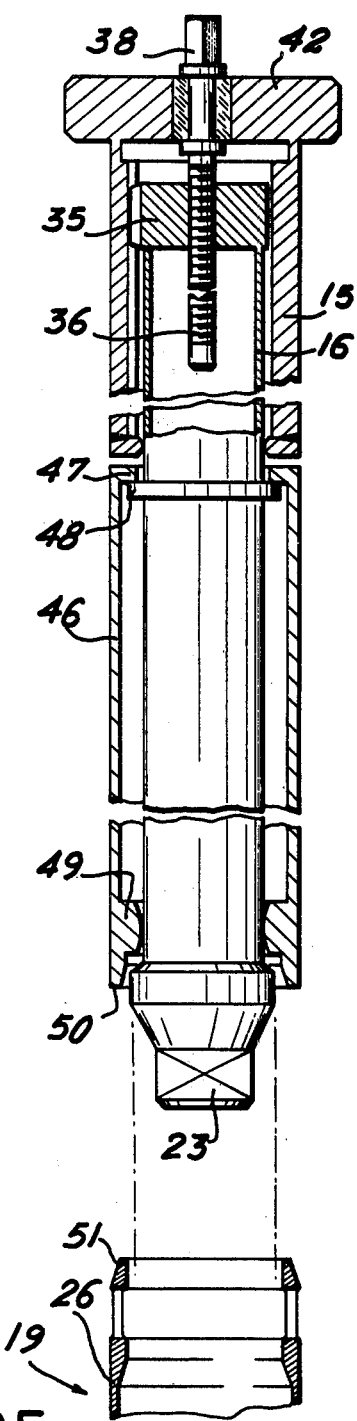

FIGS. 4 and 5 illustrate in greater detail two alternative forms of construction of the operating stem 16 which carries the electromagnet 17 and the mechanism 14 associated therewith for controlling the position of said stem either in order to support the absorber element 18 in the top position as shown in FIG. 2 or on the contrary, after dropping and immobilization of the absorber element as shown in FIG. 3, in order to retrieve the head 20 within the casing 19 by means of the same electromagnet 17 and to return the element to its initial position.

To this end, the operating stem 16 which is adapted to carry the armature 23 of the electromagnet 17 at the lower extremity thereof is provided at the opposite upper extremity thereof with a cross-piece 35 forming a nut and provided for the purpose aforesaid with a central internally-threaded bore which is engaged with a lead-screw 36. The upper portion of said lead-screw passes through a leak-tight bearing 37 and terminates in a nut 38 located on the outside of the shield plug 12 which supports the complete assembly. Said nut permits rotation of the lead-screw by means of any tool which is suited to the purpose.

The cross-piece 35 which is rigidly fixed to the stem 16 has a lateral key 39 which serves to secure said stem against rotational motion and to convert the movement of the lead-screw 36 into a vertical movement of displacement of the stem 16, the key 39 being capable of sliding within a groove 40 formed in the internal surface 41 of the sliding sleeve 15 which surrounds the stem 16.

The sleeve 15 is provided at the upper extremity with a lid 42 applied against a bearing surface of the rotating shield plug 12, said lid being traversed by the lead-screw 36 and by electrical connections 44 and 45 which serve to supply current to the electromagnet 17 through the hollow stem 16.

A centering collar 43 is advantageously provided at the lower extremity of the sleeve 15 so as to guide the stem 16 during its axial movement under the action of the lead-screw 36, especially when said stem penetrates into the casing 19 in order to couple the armature 23 with the head 20 by means of the coupling end-piece 22. To this end, the electromagnet 17 is preferably given a frusto-conical external profile which facilitates its admission into the casing even in the event of slight misalignments between the axis of said casing and the axis of the operating stem 16.

In the alternative embodiment which is illustrated in FIG. 5, the mechanism for controlling the operating stem 16 is substantially equivalent to the mechanism illustrated in FIG. 4 except for the practical construction of the sliding sleeve 15. In this alternative embodiment, said sleeve has an extension in the form of a second tube 46 terminating in a top flange 47 which is applied against an annular flange 48 of the operating stem 16 itself, said tube 46 being thus directly carried by the stem. The bottom portion of said tube 46 is also provided with a centering collar 49 having an extension in the form of a conical bearing surface 50 as shown in this example of construction. Said conical bearing surface enables the tube 46 to be positioned over the suitably shaped top end 51 of the shell 26 of the casing 19 and to be applied against this latter while ensuring more accurate centering of the operating stem 16 with respect to the casing 19 at the time of downward motion of said stem.

In both alternative forms of construction, effort-limiting devices can be adapted to the manual or motor-driven means for operating the lead-screw in order to ensure excellent contact between the electromagnet armature and the absorber element head in the bottom position.

It should finally be noted that the mechanism advantageously comprises a device (not shown in the drawings) designed to transmit to the exterior of the containment structure a signal which indicates engagement with the absorber element head as well as the bottom or top position of this latter within the open casing which contains said absorber element.

The operation of the safety device as thus constructed can readily be deduced from the foregoing description. Thus, during normal operation of the reactor, the absorber element 18 is located within the top blanket of the peripheral portion 3 of the reactor core, that is to say outside the central portion 2 containing the fissile material of the fuel assemblies and therefore in a region in which the neutron flux is of relatively low value. In this case, the absorber element 18 is suspended from the armature 23 of the electromagnet 17 at the lower end of the operating stem 16, this latter having previously been brought by means of its control mechanism 14 to the level of the top extremity of the open casing 19 in the top position illustrated in FIG. 2.

When it is necessary for any given reason to initiate fast dropping of the absorber element 18 into the central portion 2 of the reactor core, it is sufficient in particular to cut-off the voltage supply of the electromagnet 17 in order to permit the absorber element to drop freely under the action of gravity within the casing 19; the links 24 having a boron carbide base are thus introduced directly into the central portion in which the negative reactivity contained therein causes instantaneous shutdown of the reactor, the bottom position of the element being illustrated in FIG. 3. Since the mean velocity of falling motion of the absorber element under normal conditions can be of the order of 4 m/sec, it is particularly desirable to slow-down the falling motion of the element over a short distance at the end of travel. This slowing-down is carried out automatically by means of the dashpot system constituted by the assembly of head 20 and annular projection 21, said assembly being adapted to cooperate with holes 28 through which the liquid metal coolant escapes to the exterior of the shell 26 of the casing 19.

From the constructional arrangements contemplated in the foregoing, it is clearly apparent that the free fall of the absorber element within its casing can also be initiated even without direct control of the electromagnet, the only essential requirement being the separation of the disconnectable coupling provided by the coupling end-piece 22 between the armature 23 and the head 20 of the absorber element 18.

This accordingly applies in particular in the event of substantial deformation of the core structures which gives rise to considerable misalignment of the axis of the casing 19 and the axis of the operating stem 16. In point of fact, the result of the transverse effort produced by such a misalignment on the connection between the endpiece 22 and the armature 23 is that said connection is broken and the absorber element is dropped under exactly the same conditions as those described earlier. It is worthy of mention that in all cases, the flexible form of the absorber element which results from the articulation of the links 24 with respect to each other permits the free fall within the casing 19 even in the event of partial buckling of the casing during operation of the reactor or of limited flattening of said casing as a result of swelling of the adjacent wrappers containing the fuel pins.

Figure 6:
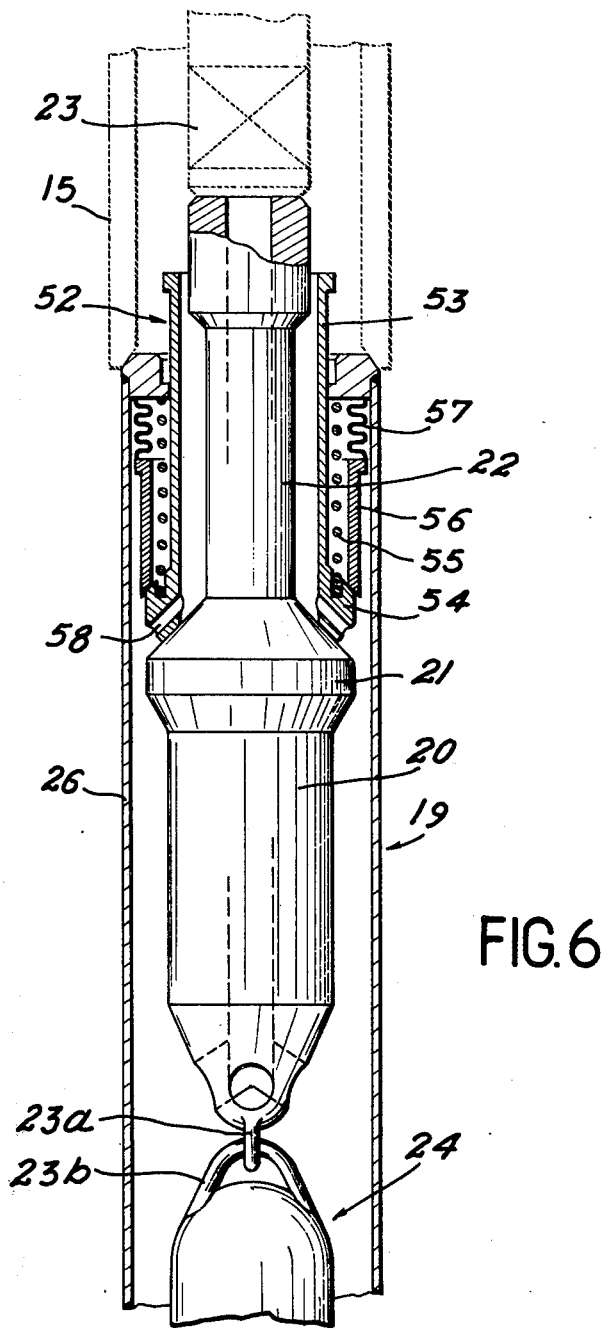
FIG. 6 illustrates an improvement made in the construction of the absorber element.

The alternative embodiment which is shown in FIG. 6 illustrates an improvement made in the device under consideration by also permitting automatic dropping of the absorber element 18 as a result of any abnormal variation in the flow rate of liquid metal coolant within the casing 19, especially in the event of reduction in said flow rate below a predetermined threshold as may arise, for example, from blockage within the circuit or from an operational incident in the circulating pumps. To this end, the head 20 of the absorber element 18 is associated with a valve 52 comprising a cylindrical sleeve 53 which surrounds the coupling end-piece 22. Said sleeve 53 is provided at the lower extremity with a conical collar 54 against which is preferably applied a spring 55, said spring being protected from the flow of liquid metal by an external skirt 56 which is joined to a bellows seal 57. Ducts 58 are formed within the conical collar 54 in order to permit normal flow of the liquid metal.

Under normal operating conditions, the pressure of the liquid metal which flows upwards within the casing 19 is sufficient to ensure that the action of the spring 55 of the valve 52 does not result in separation of the end-piece 22 from the supporting armature 23 even when the weight of the absorber element 18 is added thereto. On the other end, if the rate of flow of liquid metal through the conical collar 54 falls below a predetermined limiting value, the spring 55 combined with the weight of the absorber element exceeds the threshold of attraction by the armature 23 and initiates a free fall within the casing under the conditions described earlier.

It should be noted that in this alternative embodiment, resetting of the device requires compression of the spring in order to return the absorber element head to the top position; the coil of the electromagnet must be supplied with current at a higher intensity which can then be reduced to the desired conditions of equilibrium.

Finally and in a further design solution which is illustrated in FIGS. 7a and 7b, the dashpot which serves to damp the fall of the absorber element within the casing 19 is directly incorporated in the head 20. In this case, said head 20 is designed in the form of a hollow sleeve 60 and has a bearing surface 61 beneath the top portion 62 of the casing. Said sleeve is provided with a series of holes 63 formed through the sleeve wall and defines an internal cylinder 64 which permits the displacement of a piston 65 fitted with piston-rings 66 in the external surface which is applied against the cylinder 64. In the top position, the piston 65 projects beyond the top edge of the sleeve 60 and is rigidly fixed to the armature 23 of the electromagnet 17. When voltage is no longer applied to said electromagnet or when the absorber element is caused to drop within the casing for any of the reasons explained earlier, the piston 65 is freed from the electromagnet and the free fall of the absorber element 18 is initiated. At the end of this downward motion of the element, the sleeve 60 comes into abutment with projecting lugs 67 or against a stop collar. The piston 65 then continues its movement within the cylinder 64 while being slowed-down by the volume of liquid metal contained in said cylinder and slowly expelled through the holes 63 under the action of said piston.

The advantages of the safety device in accordance with this constructional design result from the foregoing description and from all the considerations which have been given. This device which preferably makes use of an electromagnet is particularly reliable since any damage sustained by the supply and control circuit of said electromagnet necessarily initiates the fall of the absorber element and is therefore conducive to safety. By virtue of its relatively large mass although this latter is confined within a small volume, the absorber element always drops within its casing through the reactor core in a relatively very short time. Furthermore, by reason of its articulated structure, the absorber element is capable of operating even with deformed structures which produce appreciable variations in the value of the clearance left between the links of the element and the internal surface of the casing. Finally, the practical application of a screw and nut mechanism of very simple design ensures the highest standard of safety in regard to control of the position of the absorber element with respect to the reactor core.

The presence of the damping dashpot which is incorporated in the open-topped casing or in the head of the absorber element also constitutes an appreciable advantage especially by reason of the fact that the slowing-down action is produced directly on said head, that is to say above the articulated elements, thereby applying tension to the articulated links during the falling motion and facilitating centering within the casing. Finally, the arrangement of the different components of the control mechanism is such that the operation of the rotating shield plugs cannot have any adverse effect whatsoever on the arrangement of the fuel assemblies within the reactor core and in particular on the casing which serves to guide the absorber element which never passes beyond the top level of the reactor core.

As has already been brought out by the foregoing description, it is readily apparent that the invention is not limited to the example of construction and to the detail alternative forms which have been more especially described and illustrated. In particular, it would not constitute any departure from the scope of the invention to make provision for a mechanical or hydraulic device, especially of the spring or jack type, this device being mounted at the lower end of the open casing in which the absorber element is capable of displacement under the action of gravity and being connected to the lower extremity of the chain constituted by the articulated links. Said device would have the intended funtion of exerting a complementary tractive effort on the absorber element whenever the head is separated from the supporting armature, the object thus contemplated being to limit the time necessary for the introduction of these links into the reactor core.

Similarly, no limitation need be envisaged in regard to the particular structure of the links themselves, the mode of connection of said links, or the material of which they are formed.

Finally, it is self-evident that the control mechanism of the electromagnet could be designed with a different technology without modifying its characteristic function. The electromagnet itself could be replaced by a mechanical grab or by any similar system for providing a readily separable connection at the level of the absorber element head at the top portion of the open casing.

What we claim is:

1. In a fast nuclear reactor having a reactor core, a safety device comprising an articulated absorber element, a supporting head for said element, a disconnectable coupling joining said head to the lower extremity of an axially movable vertical operating stem, said absorber element after separation of the disconnectable coupling dropping under gravity from a top position to a bottom position within a passage through the reactor core, a casing for said passage open at the upper extremity thereof and located within the core among wrappers containing nuclear fuel and having the same length as said wrappers, the upper part of said casing being located at the same level as said wrappers, the reactor core being cooled by an upward circulation of liquid metal, a central fuel zone in said core, a peripheral blanket zone in said core which completely surround the central zone, said disconnectable coupling being an electromagnet armature on said stem and in the top position of said absorber element being located about the same level as the upper part of said casing, said head being engaged within said casing, said absorber element extending in said casing through said peripheral blanket zone externally of said central zone, said head of said absorber element in the bottom position engaging an external annular projection on said head with an internal abutment shoulder in said casing to stop the fall of said absorber element at the vertical level of said central core zone and means formed by said head and said casing for damping the fall of said element by acting on said head of said absorbent element.

2. A reactor according to claim 1, wherein said articulated absorber element includes absorber links attached to each other in a chain beneath said supporting head of said absorber element.

3. A reactor according to claim 1, wherein said damping means comprises holes of small diameter in the wall of said open casing for escape of liquid metal coolant which flows through the reactor core, said coolant being compressed within said casing between said annular projection on said absorber element head and said abutment shoulder.

4. A reactor according to claim 1, including a valve coaxial with said casing, said head of said absorber element traversing said cylindrical valve in the top position within said open casing, said valve including a spring applied against a collar formed at the lower end of said valve to separate said disconnectable coupling upon limitation of flow of the liquid metal coolant within said casing.

5. A reactor according to claim 1, wherein said head of said absorber element comprises a hollow sleeve having holes through the surface of said sleeve and defining a cylinder, a piston slidably mounted in said cylinder, said sleeve cooperating in the bottom position of said absorber element with an annular shoulder projecting from the internal wall of said casing, said piston slowing said absorber element at the end of a free fall by discharging through said holes the liquid metal in said cylinder.

* * * * *